(12) United States Patent
Logger

(10) Patent No.: US 7,497,449 B2
(45) Date of Patent: Mar. 3, 2009

(54) CHILD BUGGY WITH WHEEL WITH SUSPENSION, WHEEL WITH SUSPENSION AND SWIVEL WHEEL WITH SUSPENSION

(75) Inventor: Stéphane Logger, Amsterdam (NL)

(73) Assignee: Royalty Bugaboo GmbH, Zug (CH)

( * ) Notice: Subject to any disclaimer, the term of this patent is extended or adjusted under 35 U.S.C. 154(b) by 359 days.

(21) Appl. No.: 10/562,936

(22) PCT Filed: Jun. 30, 2004

(86) PCT No.: PCT/NL2004/000465

§ 371 (c)(1),
(2), (4) Date: Apr. 20, 2006

(87) PCT Pub. No.: WO2005/002882

PCT Pub. Date: Jan. 13, 2005

(65) Prior Publication Data

US 2006/0237930 A1  Oct. 26, 2006

(30) Foreign Application Priority Data

Jul. 1, 2003  (NL) .................................... 1023789

(51) Int. Cl.
*B62B 9/00* (2006.01)
(52) U.S. Cl. ......................... 280/47.38; 280/647; 16/19; 16/32
(58) Field of Classification Search ............ 280/33.992, 280/33.994, 642, 647, 657, 658, 47.34, 47.35, 280/47.38; 16/18 R, 19, 32, 33, 34, 37
See application file for complete search history.

(56) References Cited

U.S. PATENT DOCUMENTS

| 5,581,843 | A | * | 12/1996 | Purnell | ........................ 16/35 R |
| 5,967,535 | A |   | 10/1999 | King    |  |
| 6,663,122 | B1 | * | 12/2003 | Lin | .......................... 280/47.38 |

FOREIGN PATENT DOCUMENTS

| GB | 881079      | 11/1961 |
| JP | 2003-165302 | 6/2003  |

* cited by examiner

*Primary Examiner*—Christopher P Ellis
*Assistant Examiner*—John D Walters
(74) *Attorney, Agent, or Firm*—Sughrue Mion, PLLC

(57) ABSTRACT

The invention relates to a swivel wheel (10) with suspension (14), comprising a wheel frame (11), a wheel element (12) able to turn about a horizontal wheel axle (13), a suspension (14) and an arm (15). At one end the arm (15) is attached to the wheel frame (11) such that it can pivot about a horizontal arm axis (17) and at the other end it supports the wheel axle (13) some distance away from the arm axis (17). The suspension (14) engages on the arm (15) at an arm engagement point (18) and on the wheel frame (11) at a frame engagement point (19). The arm engagement point (18) and the frame engagement point (19) define a straight suspension axis (20) running through these points. The wheel furthermore has an adjustment mechanism (30) that is equipped for setting the distance (D) from the suspension axis (20) to the arm axis (17) by moving the arm engagement point (18) and/or the frame engagement point (19) along an adjustment track (31).

12 Claims, 3 Drawing Sheets

CHILD BUGGY WITH WHEEL WITH SUSPENSION, WHEEL WITH SUSPENSION AND SWIVEL WHEEL WITH SUSPENSION

The present invention relates to a child buggy comprising a buggy frame, a carrier for a child and at least three wheels, at least one wheel of which is a wheel with suspension, wherein the at least one wheel with suspension comprises:
a wheel frame,
a wheel element able to turn about a horizontal wheel axle,
a suspension and
an arm;
wherein the arm, on the one hand, is attached to the wheel frame such that it can pivot about a horizontal arm axis and, on the other hand, supports the wheel axle some distance away from the arm axis;
wherein the suspension, on the one hand, engages on the arm at an arm engagement point and, on the other hand, engages on the wheel frame at a frame engagement point; and wherein the arm engagement point and frame engagement point define a straight suspension axis running through these engagement points.

According to the invention a child buggy is understood to be a buggy with at least three wheels, usually three or four wheels, for transporting babies and small children. The children to be transported using a child buggy will (could) be 0 months to 6 years old or even somewhat older. A child buggy is usually pushed or pulled by an adult or older child. In the case of a baby, the carrier for the child can be, for example, a carrycot, a cot for sleeping/lying or a sort of hammock. In the case of toddlers, infants and pre-school children, the carrier for the child will usually be a seat. Furthermore, a child buggy according to the invention can be foldable/collapsible.

U.S. Pat. No. 5,967,535 discloses a child buggy according to the precharacterising clause of claim 1, which is provided with swivel wheels with suspension. The swivel wheel with suspension according to U.S. Pat. No. 5,967,535 comprises a wheel frame (250), a wheel element (4) able to turn about a wheel axle (270), a suspension (330) and an arm (260). The wheel frame (250) is provided with a bearing bush (620) in which a swivel pin (220) provided on the child buggy can be accommodated. The bearing bush (620) defines a vertical swivel axis about which the swivel wheel is able to swivel with respect to the child buggy. The arm (260) is attached at one end to the wheel frame (250) by means of a horizontal pin (310), such that it can pivot. At its other end, the arm supports the wheel axle (270). The suspension consists of a coil spring (330), one end of which is permanently fixed to the arm (260) by means of a cross (760). The other end of the spring (330) is permanently fixed to the wheel frame (250) by means of a projection (670) extending into the spring (330). Here the coil spring (330) is completely built-in and is neither visible nor accessible from the outside.

The aim of the present invention is to provide a child buggy of the type indicated in the preamble with which the effectiveness of the suspension can be set and specifically in particular can be set by a user without any technical knowledge.

Said aim is achieved according to the invention by providing a child buggy of the type indicated in the preamble, which child buggy is characterised in that the wheel with suspension has an adjustment mechanism that is equipped for setting the distance from the axis of the suspension to the axis of the arm by moving the arm engagement point and/or the frame engagement point along an adjustment track. It is clear to a person skilled in the art that such an adjustment mechanism can be implemented in a wide variety of ways. For example, the suspension can be provided at one end with a pin and with this arrangement the adjustment track can, for example, contain a series of holes in which this pin can be inserted. With this arrangement the adjustment track will usually run in a plane perpendicular to the axis of the arm. By setting the effectiveness of the suspension in this way by moving an engagement point for the suspension along an adjustment track a user without technical training is able to see whether the suspension is set to be stiffer or softer. This insight can optionally be increased for the user by suitable markings along the adjustment track.

According to a further embodiment, the suspension will be pivotably joined, at least at the engagement point that can be moved along the adjustment track, but preferably at both engagement points, to the arm—in the case of the arm engagement point—and to the wheel frame—in the case of the frame engagement point—respectively.

According to yet a further embodiment of the invention, the wheel with suspension is a swivel wheel and the wheel frame defines a vertical swivel axis about which the wheel frame can be swivelled with respect to the buggy frame. The adjustable suspension according to the invention makes installation in a limited space possible and can thus be used for a swivel wheel. However, it is pointed out here that if the wheel with suspension is not a swivel wheel but a fixed wheel, the boundary between wheel frame and buggy frame is less well defined and that it will be clear to a person skilled in the art that, entirely within the scope of the invention, part of the buggy frame could be the wheel frame/belong to the wheel frame.

According to the invention, the suspension can be of very diverse nature. The suspension can be, for example, a coil spring or a resilient element in some other way. However, instead of this or supplementary thereto, the suspension can also be a shock absorber. Such a shock absorber can, for example, comprise a cylinder/piston system. However, it is also conceivable that the suspension comprises a plastic or rubbery element that has both resilient and shock-absorbing properties.

According to the invention it is advantageous if the adjustment track is in the shape of an arc sector, the concave/hollow side of which faces the suspension. In this way it is possible to have the engagement point to be moved move at least approximately along an arc sector, the corollary of which is that the effective length of the suspension can stay approximately the same during the adjustment. With this arrangement, according to the invention it is particularly advantageous if the frame engagement point/arm engagement point can be moved along the arc-shaped adjustment track, if the arm engagement point/frame engagement point is fixed and if, when the suspension is in the extended position, the arm engagement point/frame engagement point defines the mid point of the arc-sector-shaped adjustment track. In this way it is possible to adjust the suspension without, or at least virtually without, exerting a force. With this arrangement, two embodiments are thus possible. A first embodiment where the arm engagement point is fixed and the frame engagement point can be moved along the adjustment track and a second embodiment where the frame engagement point is fixed and the arm engagement point can be moved along the adjustment track. If the arm engagement point is fixed, it is advantageous according to the invention if the arm engagement point is provided at the wheel axle. This is with a view to, on the one hand, a slim construction and, on the other hand, a maximum range for setting the effectiveness of the suspension; after all, the greater the distance from the axis of the suspension to the axis of the arm the stiffer will be the setting of the suspension. "Provided at the wheel axle" is then also understood to mean within a range of approximately 15% of the distance between the wheel axle and the axis of the arm. A further advantage of an arm engagement point provided at the wheel axle is that the distance from the engagement point to the axis of the arm is then maximum, so that a relatively stiff suspension can be achieved with a relatively weak spring. The relatively weak spring, in turn, is advantageous when adjusting the suspension. After all, during adjustment the spring will have to be compressed to release the frame engagement point.

In order also to be able to make the suspension completely inoperative, optionally temporarily, it is advantageous according to the invention if the adjustment track has an adjustment range such that the axis of the suspension can be set to intersect the axis of the arm. After all, when the axis of the suspension intersects the axis of the arm, the moment exerted by the suspension with respect to the axis of the arm is zero.

According to a further advantageous embodiment, the wheel with suspension according to the invention furthermore has locking means for locking the suspension with respect to the adjustment track. It will be clear to a person skilled in the art that such locking means can be implemented in a wide variety of ways. For example, by means of the pin, which has already been mentioned, at the end of the suspension, which can be inserted in holes made at points distributed along the adjustment track, optionally supplemented by a retaining member that prevents axial movement of said pin.

According to a further advantageous embodiment of the invention, the adjustment track has toothing facing the suspension and each depression between the teeth of the toothing defines an engagement point, which engagement point is a frame engagement point if the adjustment track extends along the wheel frame or an arm engagement point if the adjustment track extends along the arm, and wherein the suspension comprises an engagement part for engaging in the respective depressions between the teeth. Such toothing makes it easily possible for the user to adjust the suspension by placing the engagement part of the suspension in the desired depression between the teeth. For adjustment, the suspension then only has to be pushed in a little to remove the engagement end from the 'old' depression between the teeth and then, after tilting the suspension through a certain angular distance, letting the engagement part drop into the 'new' depression between the teeth. Optionally, it is also conceivable to move the toothing somewhat away from the suspension, or alternatively towards the suspension, instead of depressing the suspension or allowing it to spring outwards. By fitting the suspension pretensioned it is possible to counteract the suspension coming out of the toothing (more easily) by itself.

So as to prevent the suspension unintentionally being able to fly out of the relevant depression between the teeth or completely out of the adjustment track with the embodiment that has just been discussed, with this arrangement it is advantageous according to the invention if the suspension is provided with a pin at the adjustment track and if a retaining bracket extends parallel to the adjustment track, which retaining bracket runs along the side of the pin facing away from the toothing and is optionally in contact with the pin on this side. This bracket then holds the engagement part in the relevant depression between the teeth or at least prevents the engagement part being able to fly completely out of the adjustment track, which could occur relatively easily in the case of a pretensioned suspension if the bracket were not present. Such a bracket can be fixed at one end to the wheel frame such that it can be turned and connected at the other end to the wheel frame of a snap-fit connector that can be decoupled. However, such a bracket can also be an elastic element, such as an elastic belt, for example made of rubber, or an elastic body, for example made of rubber, which is pretensioned so as to press the engagement part into the depression between the teeth. For adjustment it is then necessary only to overcome the pretension in the elastic element.

According to a further aspect the invention relates to a wheel with suspension according to claim 11 and also to a swivel wheel with suspension according to claim 13. The advantages of such wheels with suspension have already been explained above, as have also the special, more detailed embodiments according to claims 3-10, which also constitute particular, more detailed embodiments of the wheel with suspension and the swivel wheel with suspension, respectively, according to the invention.

It will be clear that the wheel with suspension and the swivel wheel with suspension, respectively, according to the invention can also be used with other constructions; consideration can be given, for example to a rollator.

The present invention will be explained in more detail below with reference to an example shown diagrammatically in the drawing. In the drawing.

Figure 1:
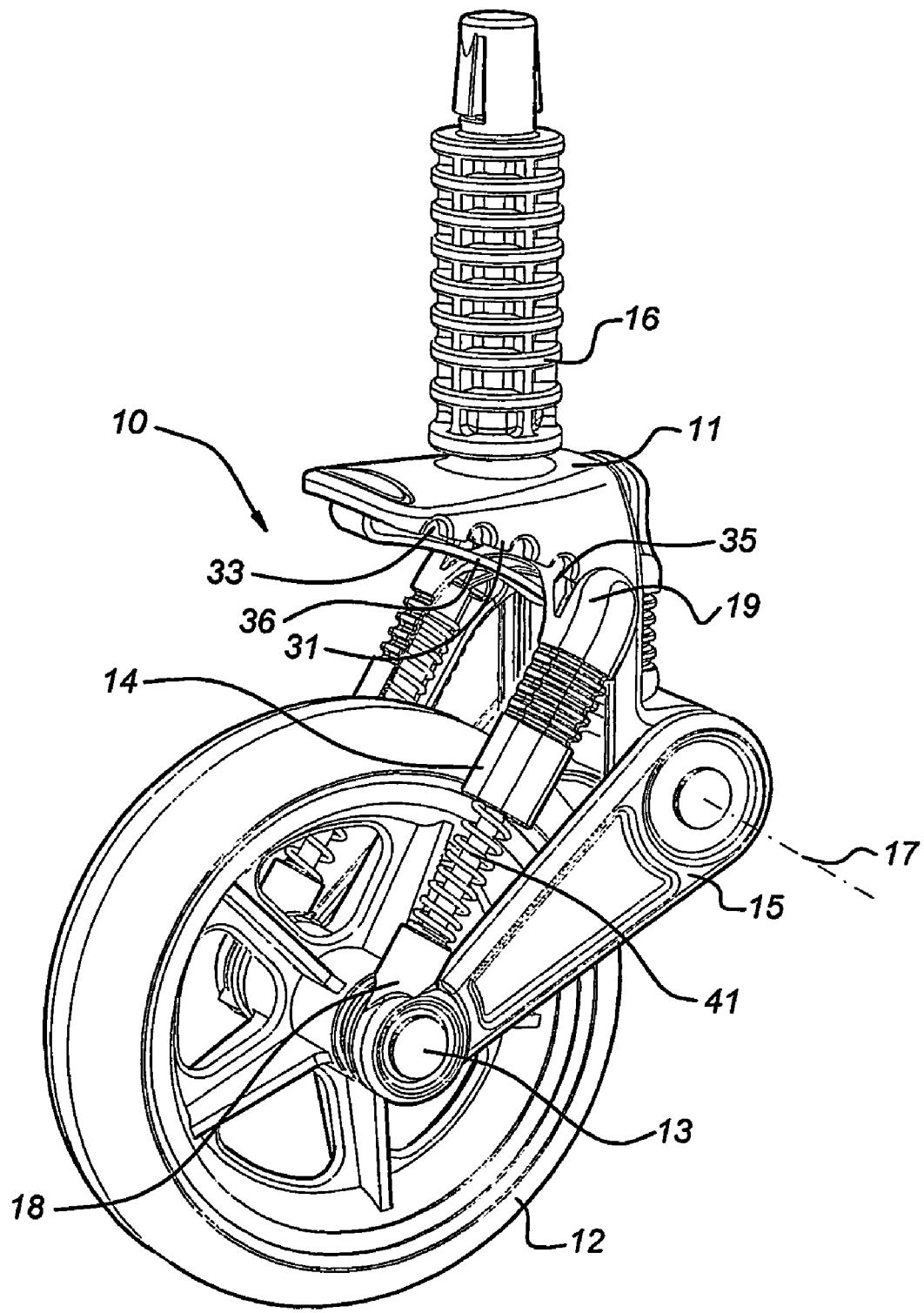
FIG. 1 shows a diagrammatic, perspective view of a swivel wheel according to the invention.

In FIGS. 1 to 5 reference numerals corresponding to one another have been used, but not all reference numerals are always shown again in all figures.

With reference to FIGS. 1 to 5, the swivel wheel 10 with suspension according to the invention comprises a wheel frame 11, a wheel element 12 able to turn about a horizontal wheel axis 13, a suspension 14 and an arm 15. The wheel frame 11 defines a vertical swivel axis 16 around which the wheel frame 11 can be swivelled with respect to a further construction—such as the frame of a child buggy 100 from FIG. 6—to which the swivel wheel can be attached. With this arrangement the wheel frame 11 can be provided with a swivel pin that extends into a swivel bearing provided on the further construction, but, conversely, the wheel frame 11 can also be provided with a swivel bearing into which a swivel pin provided on the further construction extends. The connection between the wheel frame and a further construction can also be implemented in another way known from the state of the art. The arm 15 is attached at one end to the wheel frame 11 such that it can pivot. Here the ability of the arm 15 to pivot with respect to the wheel frame 11 is defined about the horizontal arm axis 17. At the other end the arm 15 supports the wheel axle 13. With this arrangement the wheel axle 13 is both some distance away from the swivel axis 16 and some distance away from the arm axis 17. The suspension 14 engages at one end on the arm 15 and at the other end on the wheel frame 11. The point where the suspension 14 engages on the arm 15 is designated here as arm engagement point. The point where the suspension 14 engages on the wheel frame 11 is designated here as frame engagement point 19. An imaginary, straight suspension axis 20 runs through the engagement points 18, 19.

The suspension 14 can be constructed in a wide variety of ways known from the state of the art. The suspension shown by way of example in the drawing is made up of a housing 14 in which a pin 41 is accommodated in a telescopic manner. A coil spring 42 is provided around the pin 41, which spring also extends into housing 40. In the fully depressed position—see FIGS. 3 and 5—the pin 41 will be virtually completely or completely in the housing 40, as will also the coil spring 42. With this arrangement the coil spring 42 can extend from the bottom of the pin 41 to the top of the housing 40. The pin 41 can be a telescopic pin that extends to the top of the housing 40.

A swivel wheel with suspension such as has been described up to now with reference to the drawing—that is to say without adjustability of the suspension 14—is known with a coil spring as suspension, for example from U.S. Pat. No. 5,967,535, which has been discussed above.

Figure 2:
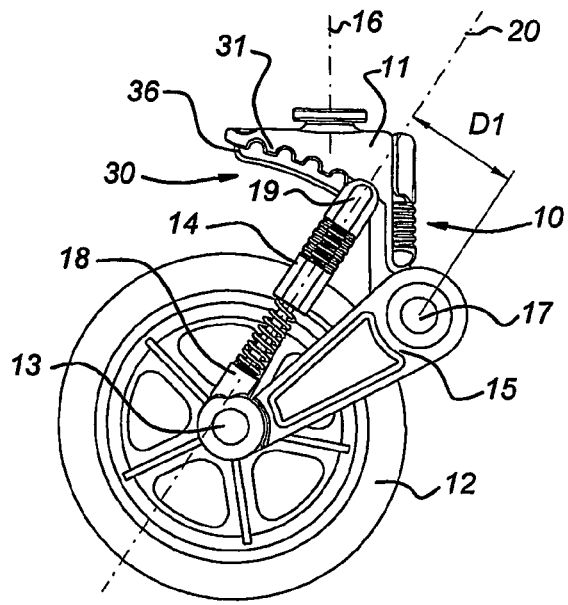
FIG. 2 shows a diagrammatic side view of a swivel wheel according to the invention in an extended position in the case of a soft setting of the suspension.
Figure 3:
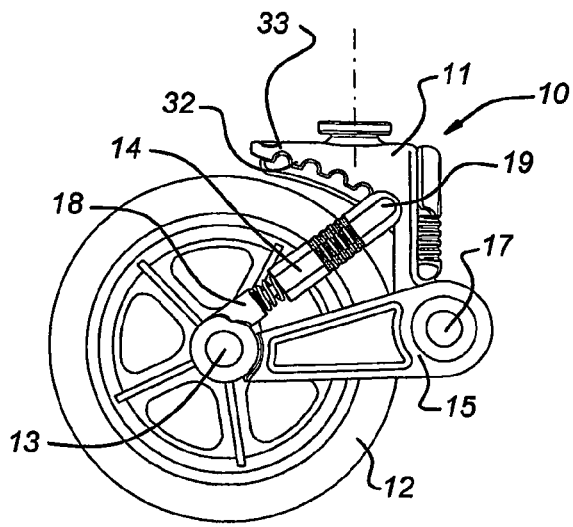
FIG. 3 shows a view corresponding to FIG. 2, but now in the fully depressed position.
Figure 4:
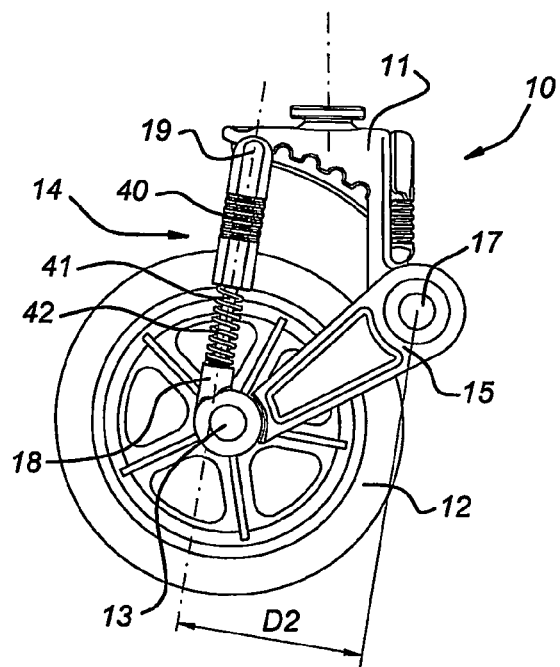
FIG. 4 shows a view corresponding to FIG. 2, but now with a stiff setting of the suspension and a fully extended position.
Figure 5:
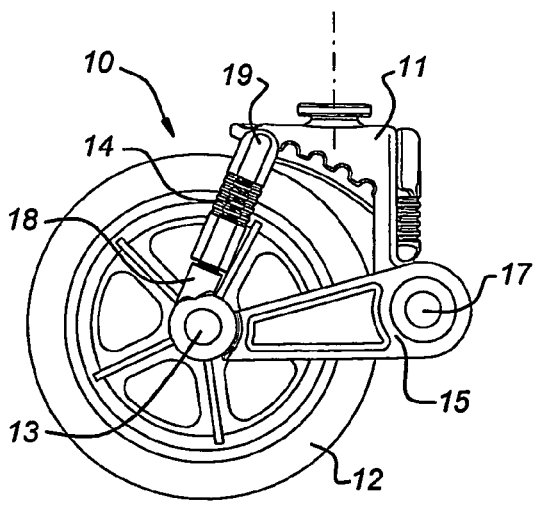
FIG. 5 shows a view corresponding to FIG. 4, but now in the fully depressed position.

According to the invention, the swivel wheel furthermore comprises an adjustment mechanism 30. The adjustment mechanism is so constructed that the distance D from the suspension axis 20 to the arm axis 17 can be adjusted by means of this mechanism. A soft setting of the suspension 14, where the distance D is shown as $D_1$, is shown in FIG. 2. A stiff setting of the suspension 14, where the distance D is shown as $D_2$, is shown in FIG. 4. The greater the distance D the stiffer is the suspension.

According to the invention, setting of the distance D from the suspension axis 20 takes place by:

moving the frame engagement point 19 along adjustment track 31; the distance from the frame engagement point 19 to the arm axis 17 is changed during this operation; or by moving the arm engagement point 18 along an adjustment track that is not shown; the distance from the arm engagement point to the arm axis 17 is changed during this operation; or by moving both the frame engagement point 19 along the adjustment track 31 and moving the arm engagement point 18 along a further adjustment track, which is not shown; both the distance from the frame engagement point 19 to the arm axis 17 and the distance from the arm engagement point to the arm axis 17 is changed during this operation.

It will be clear that an embodiment where both the arm engagement point 18 and the frame engagement point 19 are adjustable has the advantage that the number of options for setting the suspension increases, in particular if the engagement points are not continuously adjustable along a relevant adjustment track but are adjustable along discrete setting positions provided along the respective adjustment tracks. The disadvantage of this construction, is, however, that it is more complex for the user to manage, especially if the user has little mechanical insight. After all, this construction allows an adjustment of the one point of engagement in, for example, a direction that causes the softness of the suspension to increase to be counteracted or compensated by an adjustment of the other point of engagement in a direction that causes the stiffness of the suspension to increase. With a view to a user who has little or no mechanical insight, it is therefore preferable to make do with an embodiment where only one of the points of engagement is adjustable along an adjustment track. With this arrangement the way in which the run/the design of the adjustment track is implemented is less relevant, although the invention does provide advantageous embodiments of the shape/the run of the adjustment track. If one point of engagement is fixed and the other point of engagement is adjustable, it is preferable according to the invention if the arm engagement point is fixed with respect to the arm and the frame engagement point is adjustable along the adjustment track—which essentially can be of arbitrary shape. The reason for this is that it is thus possible to provide the adjustment mechanism above the wheel element, that is to say a relatively large distance away from the ground over which the wheel element travels. In this way the risk of damage to, or disruption of, the adjustment mechanism as a result of contact with objects that are close to the ground, such as twigs and plants, is counteracted.

According to the invention it is particularly advantageous if the adjustment track is in the shape of an arc sector, the concave side of which faces the suspension 14. Such a design simplifies easy adjustment of the suspension. After all, the risk that the suspension comes completely away from the adjustment track is reduced because the adjustment track as it were runs around the point of engagement concerned in some arc shape. Furthermore, such an arc shape makes the adjustment easier because the suspension 14 usually has to be depressed only over some distance, after which it can be moved approximately parallel to the adjustment track. With such an embodiment it is particularly advantageous according to the invention if the one point of engagement is adjustable along the arc-shaped adjustment track and the other point of engagement is fixed and defines the mid point of the arc-sector-shaped adjustment track when the spring is in the extended position. In this way, when the suspension is in the extended position, the suspension can be allowed to describe a perfectly circular path when adjusting. If the arm engagement point is the fixed point of engagement (with respect to the arm 15), it is preferable with this arrangement if this point of engagement is provided at the wheel axle 13. In this way, on the one hand, a slim swivel wheel construction is achieved and, on the other hand, the adjustment range is maximised.

Although this has not been shown in the drawing, the adjustment track can be provided with an adjustment range such that the suspension axis 20 can be allowed to intersect the arm axis 17. In this intersecting position the suspension is inactive, which, for example, can be practical if objects have become trapped between the wheel element 12 and the wheel frame. With regard to such objects consideration can be given, for example, to vegetable material, but also to rope, string, etc. The user is then able fairly easily to flip the wheel element into a relatively arbitrary position with respect to the wheel frame and thus to remove the offending object more easily.

According to the invention, the adjustment track is in particularly constructed as toothing with teeth 32 facing the suspension 14, with depressions 33 between the teeth, each of which depressions defines a point of engagement for an engagement part 34 provided on the suspension 14. For adjustment it is then necessary merely to remove the engagement part 34 from the depression 33 between the teeth in which it engages at that point in time and then to tilt the suspension into another position so as to be able to make the engagement part 34 engage in a different depression between the teeth. In order, with this arrangement, to prevent the engagement part 34 unintentionally breaking free from a depression 33 between the teeth or from the adjustment track 31, it is advantageous according to the invention if locking means are provided. According to the invention, these locking means can comprise a retaining bracket 36 running parallel to the adjustment track. This retaining bracket 36 runs along that side of a pin 35 provided on the suspension that faces away from the toothing 32 and will preferably be in contact with this pin on said side facing away from the toothing, in order to counteract the effects of play. However, as can be seen in FIG. 1, the retaining bracket 36 can also run some distance away from the pin 35. Pretensioning of the suspension will then counteract the frame engagement point breaking free from the toothing. With this arrangement one end of the bracket can be pivotably fixed to the wheel frame 11 if it is an adjustment track running along the wheel frame 11 that is concerned or to the arm 15 if it is an adjustment track running along the arm that is concerned. The other end of the bracket will then be connected, preferably by means of a snap-fit connection, to the wheel frame 11 or the arm 15, respectively, such that it can be unlocked.

Figure 6:
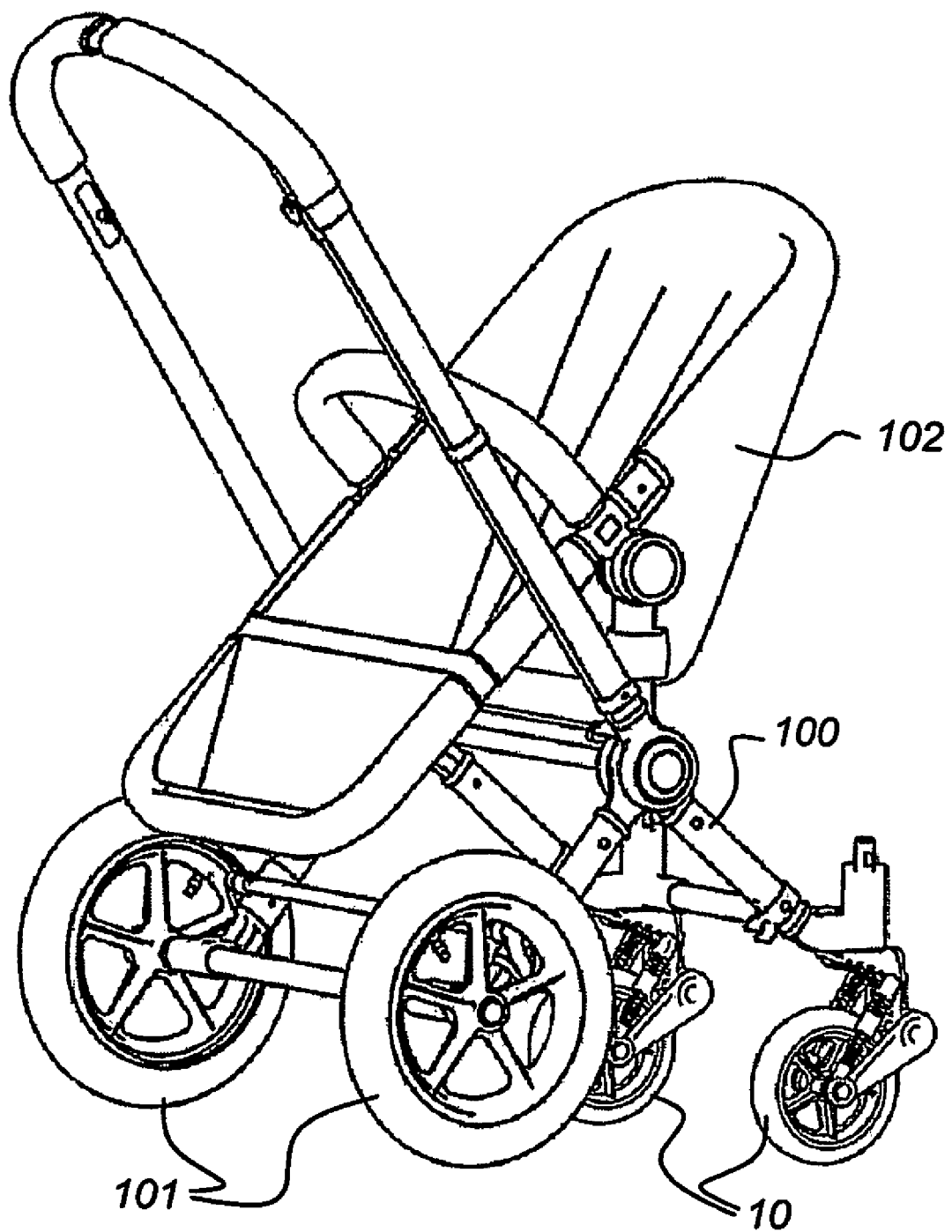
FIG. 6 shows a diagrammatic, perspective view of a child buggy according to the invention.

FIG. 6, finally, shows, highly diagrammatically, a child buggy, in this case a so-called stroller 100, provided according to the invention with two fixed rear wheels 101—that optionally can be sprung according to the invention—, a seat 102 and two front wheels that are constructed as swivel wheels 10 according to the invention. It will be clear that such a child buggy can also be provided with swivel wheels according to the invention at the rear, the front wheels then being able to be fixed wheels or swivel wheels, which may or may not be according to the invention.

Although an adjustment track 31 with discrete setting positions for the engagement point has been shown in the drawings, it will be clear to a person skilled in the art that a continuous adjustment track can also be constructed. Adjustability of the suspension 14 is then, for example, possible by, on the one hand, fixing a nut that can be turned transversely to its helical line to the suspension and, on the other hand, providing an adjustment bolt that can be swivelled transversely to its helical line on the wheel frame 11 or the arm 15 so as to adjust the suspension along the adjustment track by turning the adjustment bolt and nut relative to one another. It will be clear to a person skilled in the art that such a construction can also be implemented in another way.

Furthermore, it is pointed out that, viewed in the outwardly springed position, the suspension can also be fitted with pretension acting in the extending direction.

The invention claimed is:

1. Child buggy comprising buggy frame (100), a carrier (102) for a child and at least
    three wheels (10, 101), at least one wheel of which is a wheel (10) with suspension, wherein the at least one wheel (10) with suspension comprises:
    a wheel frame (11),
    a wheel element (12) able to turn about a horizontal wheel axle (13),
    a suspension (14) and
    an arm (15);
    wherein the arm (15), on the one hand, is attached to the wheel frame (11) such that it can pivot about a horizontal arm axis (17) and, on the other hand, supports the wheel axle (13) some distance away from the arm axis (17);
    wherein the suspension (14), on the one hand, engages on the arm (15) at an arm engagement point (18) and, on the other hand, engages on the wheel frame (11) at a frame engagement point (19); and
    wherein the arm engagement point (18) and frame engagement point (19) define a straight suspension axis (20) running through these engagement points, wherein the wheel (10) with suspension has an adjustment mechanism (30) that is equipped for setting the distance (D, D1, D2) from the axis of the suspension (20) to the axis of the arm (17) by moving the arm engagement point (18), the frame engagement point (19), or both the arm engagement point (18) and the frame engagement point (19) along an adjustment track (31).

2. Child buggy according to claim 1, wherein the wheel with suspension is a swivel wheel (10) and wherein the wheel frame defines a vertical swivel axis (16) about which the wheel frame (11) can be swivelled with respect to the buggy frame (100).

3. Child buggy according to claim 1, wherein the adjustment track (31) is in the shape of an arc sector, the concave side of which faces the suspension (14).

4. Child buggy according to claim 3, wherein the frame engagement point (19) can be moved along the arc-shaped adjustment track (31), wherein the arm engagement point (18) is fixed with respect to the arm (15) and wherein, when the suspension (14) is in the extended position, the arm engagement point (18) defines the mid point of the arc-sector-shaped adjustment track (31).

5. Child buggy according to claim 4, wherein the arm engagement point (15) is provided at the wheel axle (13).

6. Child buggy according to claim 3, wherein the arm engagement point (18) can be moved along the arc-shaped adjustment track, wherein the frame engagement point (19) is fixed and wherein, when the suspension (14) is in the extended position, the frame engagement point (19) defines the mid point of the arcsector-shaped adjustment track.

7. Child buggy according to claim 1, wherein the adjustment track has an adjustment range such that the axis of the suspension (20) can be set to intersect the axis of the arm (17).

8. Child buggy according to claim 1, wherein this furthermore comprises locking means (32) for locking the suspension with respect to the adjustment track (31).

9. Child buggy according to claim 1, wherein the adjustment track has toothing (32) facing the suspension and wherein each depression (33) between the teeth of the toothing defines an arm/frame engagement point (18, 19) and wherein the suspension (14) has an engagement part (34) for engaging in the respective depressions (33) between the teeth.

10. Child buggy according to claim 9, wherein the suspension (14) is provided with a pin (35) at the adjustment track (31) and that a retaining bracket (36) extends parallel to the adjustment track, which retaining bracket runs along the side of the pin facing away from the toothing (32) so as to keep the pin (35) retained in the adjustment track.

11. Wheel with suspension, such as for a child buggy (100), wherein the wheel with suspension comprises:
    a wheel frame (11),
    a wheel element (12) able to turn about a horizontal wheel axle (13),
    a suspension (14) and
    an arm (15);
    wherein the arm (15), on the one hand, is attached to the wheel frame (11) such that it can pivot about a horizontal arm axis (17) and, on the other hand, supports the wheel axle (13) some distance away from the arm axis (17);
    wherein the suspension (14), on the one hand, engages on the arm (15) at an arm engagement point (18) and, on the other hand, engages on the wheel frame (11) at a frame engagement point (19); and
    wherein the arm engagement point (18) and frame engagement point (19) define a straight suspension axis (20) running through these engagement points, wherein the wheel (10) with suspension has an adjustment mechanism (30) that is equipped for setting the distance (D, D1, D2) from the axis of the suspension (20) to the axis of the arm (17) by moving the arm engagement point (18), the frame engagement point (19), or both the arm engagement point (18) and the frame engagement point (19) along an adjustment track (31).

12. Swivel wheel (10) with suspension, comprising:

a wheel frame (11), a wheel element (12) able to turn about a horizontal wheel axle (13), a suspension (14) and an arm (15);

wherein the wheel frame (11) defines a vertical swivel axis (16) about which the wheel frame (11) can be swivelled with respect to a further construction to which the swivel wheel (10) can be attached;

wherein the arm (15), on the one hand, is attached to the wheel frame (11) such that it can pivot about a horizontal arm axis (17) and, on the other hand, supports the wheel axle (13) some distance away from both the swivel axis (16) and the arm axis (17); wherein the suspension (14), on the one hand, engages on the arm (15) at an arm engagement point (18) and, on the other hand, engages on the wheel frame (11) at a frame engagement point (19); and wherein the arm engagement point (18) and frame engagement point (19) define a straight suspension axis (20) running through these engagement points, wherein the swivel wheel (10) has an adjustment mechanism (30) that is equipped for setting the distance (D, D1, D2) from the axis of the suspension (20) to the axis of the arm (17) by moving the arm engagement point (18), the frame engagement point (19), or both the arm engagement point (18) and the frame engagement point (19) along an adjustment track (31).

\* \* \* \* \*